United States Patent
Iwamura et al.

(10) Patent No.: US 9,357,512 B2
(45) Date of Patent: May 31, 2016

(54) MOBILE COMMUNICATION METHOD FOR ADJUSTING TRANSMISSION TIMING IN DEVICE TO DEVICE COMMUNICATION LINK

(75) Inventors: Mikio Iwamura, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 44 days.

(21) Appl. No.: 14/113,279

(22) PCT Filed: Apr. 25, 2012

(86) PCT No.: PCT/JP2012/061045
§ 371 (c)(1),
(2), (4) Date: Oct. 22, 2013

(87) PCT Pub. No.: WO2012/157416
PCT Pub. Date: Nov. 22, 2012

(65) Prior Publication Data
US 2014/0050153 A1 Feb. 20, 2014

(30) Foreign Application Priority Data
May 19, 2011 (JP) .................................. 2011-112661

(51) Int. Cl.
*H04W 56/00* (2009.01)
*H04W 76/02* (2009.01)

(52) U.S. Cl.
CPC .......... *H04W 56/00* (2013.01); *H04W 56/0015* (2013.01); *H04W 76/023* (2013.01)

(58) Field of Classification Search
None
See application file for complete search history.

(56) References Cited

U.S. PATENT DOCUMENTS

| 6,459,690 | B1* | 10/2002 | Le Strat et al. | 370/332 |
|---|---|---|---|---|
| 8,675,482 | B1* | 3/2014 | Lu et al. | 370/230 |
| 2003/0231608 | A1* | 12/2003 | Wentink | 370/338 |
| 2004/0048609 | A1* | 3/2004 | Kosaka | 455/422.1 |
| 2004/0077376 | A1* | 4/2004 | Fang et al. | 455/557 |
| 2004/0151152 | A1* | 8/2004 | Kim et al. | 370/342 |
| 2005/0239451 | A1* | 10/2005 | Periyalwar et al. | 455/425 |

(Continued)

FOREIGN PATENT DOCUMENTS

| JP | 2003-61152 A | 2/2003 |
|---|---|---|
| JP | 2006-523408 A | 10/2006 |
| WO | 2004/091238 A1 | 10/2004 |

OTHER PUBLICATIONS

Extended European Search Report in counterpart European Patent Application No. 12785603.7, mailed Sep. 24, 2014 (6 pages).

(Continued)

*Primary Examiner* — Dung B Huynh
(74) *Attorney, Agent, or Firm* — Osha Liang LLP

(57) ABSTRACT

A mobile communication method according to the present invention includes a step of transmitting, by the mobile station UE#1, a data signal to the mobile station UE#2 via a third radio link; a step of transmitting, by the mobile station UE#2, "Timing information" indicating the time, for which the reception timing of the data signal has been deviated from a desired timing, to the radio base station eNB via a second radio link when it is detected that the reception timing of the data signal has been deviated from the desired timing by a predetermined time or more; and a step of transmitting, by the radio base station eNB, a "Ud TA command" for adjusting the transmission timing of a data signal in the third radio link to the mobile station UE via the first radio link on the basis of the received "Timing information".

4 Claims, 5 Drawing Sheets

(56) References Cited

U.S. PATENT DOCUMENTS

| | | | |
|---|---|---|---|
| 2006/0166688 A1* | 7/2006 | Sun et al. | 455/502 |
| 2006/0258383 A1* | 11/2006 | Jiang et al. | 455/502 |
| 2006/0274777 A1* | 12/2006 | Fujii et al. | 370/445 |
| 2007/0104214 A1* | 5/2007 | Hsieh et al. | 370/458 |
| 2007/0230423 A1* | 10/2007 | Yoshida et al. | 370/338 |
| 2007/0254656 A1* | 11/2007 | Dalsgaard | 455/435.1 |
| 2009/0010244 A1* | 1/2009 | Laroia et al. | 370/350 |
| 2009/0016456 A1* | 1/2009 | Li et al. | 375/260 |
| 2010/0093364 A1* | 4/2010 | Ribeiro et al. | 455/452.2 |
| 2010/0216452 A1* | 8/2010 | Gormley | 455/423 |
| 2010/0318991 A1* | 12/2010 | Venkitachalam et al. | 718/1 |
| 2011/0263245 A1* | 10/2011 | Ishii et al. | 455/423 |
| 2011/0306349 A1* | 12/2011 | Hakola et al. | 455/450 |
| 2012/0120892 A1* | 5/2012 | Freda et al. | 370/329 |
| 2012/0163235 A1* | 6/2012 | Ho et al. | 370/254 |
| 2012/0294245 A1* | 11/2012 | Chang et al. | 370/329 |
| 2013/0039324 A1* | 2/2013 | Kwon et al. | 370/329 |
| 2013/0044739 A1* | 2/2013 | Huang | 370/338 |
| 2013/0121315 A1* | 5/2013 | Langereis et al. | 370/336 |
| 2013/0273926 A1* | 10/2013 | Peng et al. | 455/450 |
| 2014/0056248 A1* | 2/2014 | Wang et al. | 370/329 |
| 2014/0057637 A1* | 2/2014 | Hoang et al. | 455/445 |
| 2014/0269668 A1* | 9/2014 | Zhu | 370/350 |

OTHER PUBLICATIONS

3GPP TS 36.323 V10.1.0; "3rd Generation Partnership Project; Technical Specification Group Radio Access Network; Evolved Universal Terrestrial Radio Access (E-UTRA); Packet Data Convergence Protocol (PDCP) specification (Release 10)"; Mar. 2011 (26 pages).

Office Action for corresponding Japanese Application No. 2011-112661, mailed Apr. 23, 2013 (7 pages).

International Search Report for corresponding International Application No. PCT/JP2012/061045, mailed Jul. 24, 2012 (3 pages).

Written Opinion for corresponding International Application No. PCT/JP2012/061045, mailed Jul. 24, 2012 (4 pages).

\* cited by examiner

MOBILE COMMUNICATION METHOD FOR ADJUSTING TRANSMISSION TIMING IN DEVICE TO DEVICE COMMUNICATION LINK

TECHNICAL FIELD

The present invention relates to a mobile communication method.

BACKGROUND ART

FIG. 6 illustrates an aspect of TA (Timing Advance) control in a conventional LTE (Long Term Evolution) scheme.

As illustrated in FIG. 6, in the TA control, a radio base station eNB is configured to align the reception timings ("Uu UL") of uplink signals, which are transmitted by a mobile station UE#1 and a mobile station UE#2, such that the uplink signals are orthogonal to each other, and to transmit "TA commands (TA1 and TA2)" to the mobile station UE#1 and the mobile station UE#2.

The mobile station UE#1 and the mobile station UE#2 are configured to adjust the transmission timings ("Uu UL") of uplink signals on the basis of the "TA commands (TA1 and TA2)" received from the radio base station eNB.

As described above, the TA control is applied, so that it is possible to correct propagation delay of the uplink signals.

CITATION LIST

Non Patent Literature

[NPL 1] 3GPP TS36.323

Furthermore, in a conventional LTE mobile communication system, even when a plurality of mobile stations UEs are located in the same cell (or a cell subordinate to a radio base station eNB), since both of a data signal and a control signal are configured to be transmitted and received via the radio base station eNB, there is a problem that a processing load of the radio base station eNB increases.

It may be possible to resolve such a problem by using a feature that a plurality of mobile stations UE transmit and receive a data signal via a radio link in an interface between mobile stations (hereinafter, a Ud interface) without passing through a radio link in a Uu interface that is set between the mobile stations UE and the radio base station eNB.

When considering direct communication (that is, Ud communication or D2D communication) between the mobile station UE#1 and the mobile station UE#2, a distance between the mobile station UE#1 and the mobile station UE#2 is problematic in the adjustment of the transmission timing via the Ud interface.

For example, as illustrated in FIG. 7(a), even when there is no change in a distance (propagation delay T1) between the mobile station UE#1 and the radio base station eNB and a distance (propagation delay T2) between the mobile station UE#2 and the radio base station eNB, if the mobile station UE#1 or the mobile station UE#2 moves on an arc, a distance (propagation delay TX) between the mobile station UE#1 and the mobile station UE#2 changes.

Furthermore, actually, a trajectory of each of the mobile station UE#1 and the mobile station UE#2 is complicated, and as illustrated in FIG. 7(b), it is considered that the distance (propagation delay TX) between the mobile station UE#1 and the mobile station UE#2 also changes simultaneously with the distance (the propagation delay T1) between the mobile station UE#1 and the radio base station eNB and the distance (the propagation delay T2) between the mobile station UE#2 and the radio base station eNB.

SUMMARY OF THE INVENTION

Therefore, the present invention has been achieved in view of the above-described problems, and an object thereof is to provide a mobile communication method with which it is possible to appropriately maintain a synchronization state between the mobile station UE#1 and the mobile station UE#2 in direct communication between the mobile station UE#1 and the mobile station UE#2.

A first characteristic of the present invention is summarized in that a mobile communication method used in a case where a first radio link has been set in a radio base station interface between a first mobile station and a radio base station, a second radio link has been set in a radio base station interface between a second mobile station and the radio base station, and a third radio link has been set in an inter-mobile station interface between the first mobile station and the second mobile station, comprising: a step of transmitting, by the first mobile station, a data signal to the second mobile station via the third radio link; a step of transmitting, by the second mobile station, timing information indicating a time, for which the reception timing of the data signal has been deviated from a desired timing, to the radio base station via the second radio link when it is detected that the reception timing of the data signal has been deviated from the desired timing by a predetermined time or more; and a step of transmitting, by the radio base station, adjustment information for adjusting a transmission timing of a data signal in the third radio link to the first mobile station via the first radio link on the basis of the received timing information.

A second characteristic of the present invention is summarized in that a mobile communication method used in a case where a first radio link has been set in a radio base station interface between a first mobile station and a radio base station, a second radio link has been set in a radio base station interface between a second mobile station and the radio base station, and a third radio link has been set in an inter-mobile station interface between the first mobile station and the second mobile station, comprising: a step of notifying, by the radio base station, the first mobile station and the second mobile station of a radio resource for data signal transmission in the third radio link via the first radio link and the second radio link; a step of transmitting, by the first mobile station, a data signal to the second mobile station by using the radio resource for data signal transmission; and a step of transmitting, by the second mobile station, adjustment information for adjusting a transmission timing of a data signal in the third radio link to the first mobile station via the third radio link when it is detected that the reception timing of the data signal has been deviated from a desired timing by a predetermined time or more.

DESCRIPTION OF EMBODIMENTS (Mobile Communication System According to First Embodiment of the Present Invention)

With reference to FIG. 1 to FIG. 4, a mobile communication system according to a first embodiment of the present invention will be described.

Figure 1:
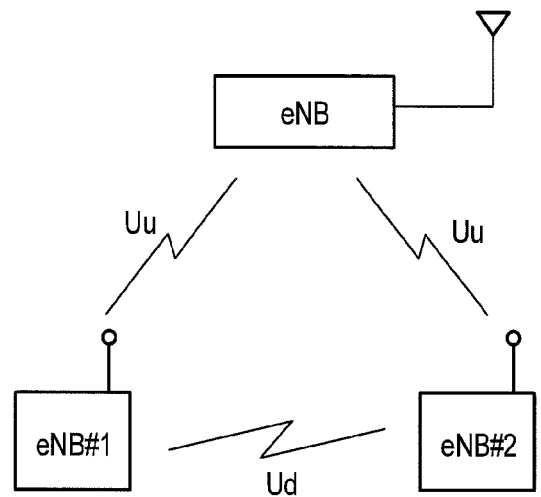
FIG. 1 is a diagram illustrating the entire configuration of a mobile communication system according to a first embodiment of the present invention.

A mobile communication system according to the present embodiment is an LTE mobile communication system, and includes a core network and a radio base station eNB connected to the core network device as illustrated in FIG. 1. The present invention is also applicable to cellular mobile communication systems other than the LTE mobile communication system.

In the mobile communication system according to the present embodiment, a Uu interface between a mobile station UE#1 and the radio base station eNB and between a mobile station UE#2 and the radio base station eNB, and a Ud interface between the mobile station UE#1 and the mobile station UE#2 have been defined.

In addition, in the mobile communication system according to the present embodiment, it is assumed that a first radio link has been established in the Uu interface between the mobile station UE#1 and the radio base station eNB, a second radio link has been established in the Uu interface between the mobile station UE#2 and the radio base station eNB, and a third radio link has been established between the mobile station UE#1 and the mobile station UE#2.

The mobile station UE#1 is configured to be able to transmit and receive a data signal to and from the mobile station UE#2 via the Ud interface without passing through the Uu interface.

Furthermore, the mobile station UE#1 is configured to be able to transmit and receive a data signal and a control signal to and from the radio base station eNB via the Uu interface.

In the same manner, the mobile station UE#2 is configured to be able to transmit and receive a data signal to and from the mobile station UE#1 via the Ud interface without passing through the Uu interface.

Furthermore, the mobile station UE#2 is configured to be able to transmit and receive a data signal and a control signal to and from the radio base station eNB via the Uu interface.

Figure 2:
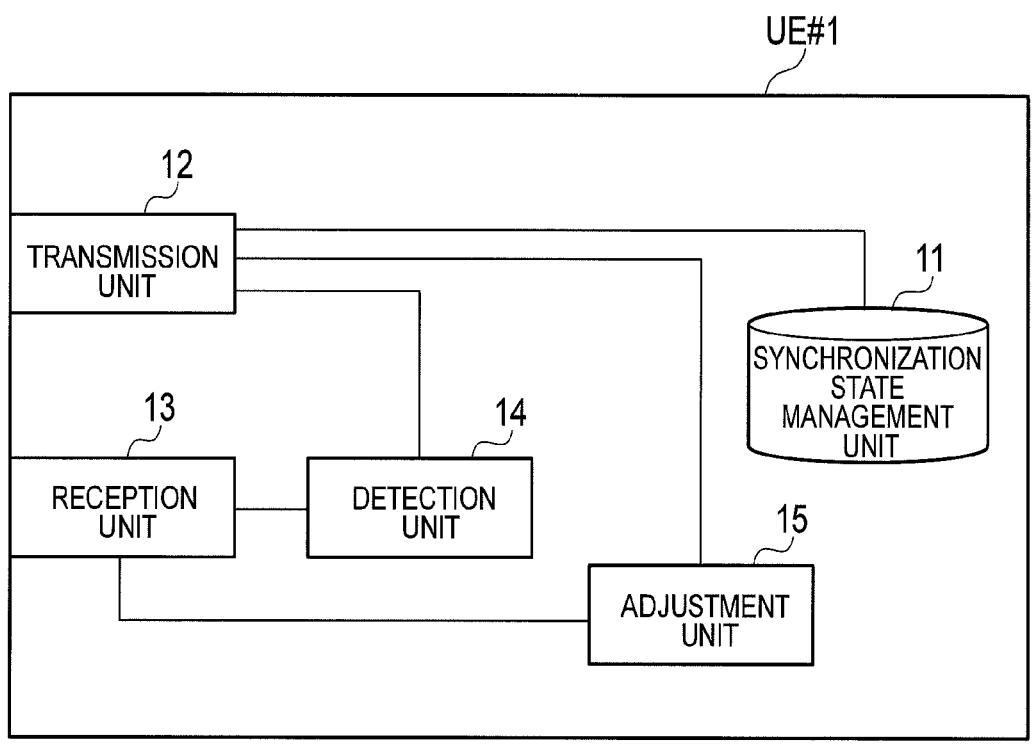
FIG. 2 is a functional block diagram of a mobile station according to the first embodiment of the present invention.

Since the function of the mobile station UE#1 and the function of the mobile station UE#2 are basically equal to each other, the function of the mobile station UE#1 will be representatively described below. As illustrated in FIG. 2, the mobile station UE#1 includes a synchronization state management unit 11, a transmission unit 12, a reception unit 13, a detection unit 14, and an adjustment unit 15.

The synchronization state management unit 11 is configured to manage a synchronization state/a non-synchronization state of a radio link established in the mobile station UE#1.

For example, the synchronization state management unit 11 is configured to manage synchronization states/non-synchronization states of the aforementioned first radio link and third radio link.

Specifically, the synchronization state management unit 11 has a timer for the Uu interface and a timer for the Ud interface, and is configured to reset the timer for the Uu interface or the timer for the Ud interface whenever a "TA command" for the Uu interface or a "Ud TA command" for the Ud interface is received.

Furthermore, the synchronization state management unit 11 is configured to determine that the first radio link is in a synchronization state while the timer for the Uu interface is being activated, and to determine that the first radio link is in a non-synchronization state when the timer for the Uu interface is expired.

In the same manner, the synchronization state management unit 11 is configured to determine that the third radio link is in a synchronization state while the timer for the Ud interface is being activated, and to determine that the third radio link is in a non-synchronization state when the timer for the Ud interface is expired.

The timer for the Uu interface and the timer for the Ud interface may be the same timer, or different timers. In addition, values of the timer for the Uu interface and the timer for the Ud interface may be configured to be notified by the radio base station eNB.

Furthermore, these timer values may also be configured to be notified by RRC signaling.

The transmission unit 12 is configured to transmit a data signal and a control signal to the radio base station eNB via the first radio link in the Uu interface, and to transmit a data signal to the mobile station UE#2 via the third radio link in the Ud interface.

The reception unit 13 is configured to receive a data signal and a control signal from the radio base station eNB via the first radio link in the Uu interface, and to receive a data signal from the mobile station UE#2 via the third radio link in the Ud interface.

The detection unit 14 is configured to detect that the reception timing of the data signal received by the reception unit 13 has been deviated from a desired timing by a predetermined time or more (Timing drift).

The predetermined time may be a value corresponding to the granularity of a "Ud TA command (which will be described later)" for adjusting a transmission timing, or a value having a defined specification.

Furthermore, when the detection unit 14 detects that the reception timing of the data signal received by the reception unit 13 has been deviated from the desired timing by the predetermined time or more, the transmission unit 12 is configured to transmit "Timing information" indicating the time □TX, for which the reception timing of the data signal has been deviated from the desired timing, to the radio base station eNB via the first radio link.

The adjustment unit 15 is configured to adjust a transmission timing (a subframe) in the following Ud interface on the basis of the "Ud TA command" received by the reception unit 13.

Furthermore, the adjustment unit 15 is configured to calculate the desired timing on the basis of a relation between a reception window and the reception timing of "Ud preamble".

Figure 3:
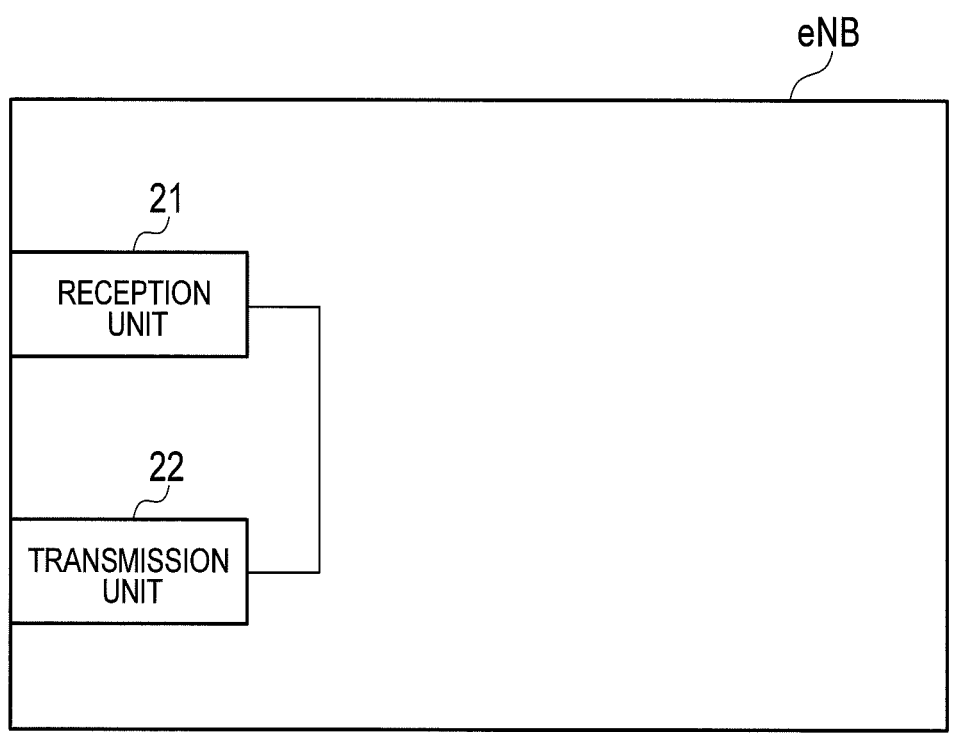
FIG. 3 is a functional block diagram of a radio base station according to the first embodiment of the present invention.

As illustrated in FIG. 3, the radio base station eNB includes a reception unit 21 and a transmission unit 22.

The reception unit 21 is configured to receive a data signal and a control signal from the mobile station UE#1 via the first radio link in the Uu interface, and to receive a data signal and a control signal from the mobile station UE#2 via the second radio link in the Uu interface.

The transmission unit 22 is configured to transmit a data signal and a control signal to the mobile station UE#1 via the first radio link in the Uu interface, and to transmit a data signal and a control signal to the mobile station UE#2 via the second radio link in the Uu interface.

Furthermore, on the basis of "Timing information" received by the reception unit 21, the transmission unit 22 is configured to transmit a "Ud TA command" for adjusting the transmission timing of a data signal in the third radio link to the mobile station UE#1 via the first radio link or the second radio link.

Hereinafter, with reference to FIG. 4, the operation of the mobile communication system according to the present embodiment will be described.

Figure 4:
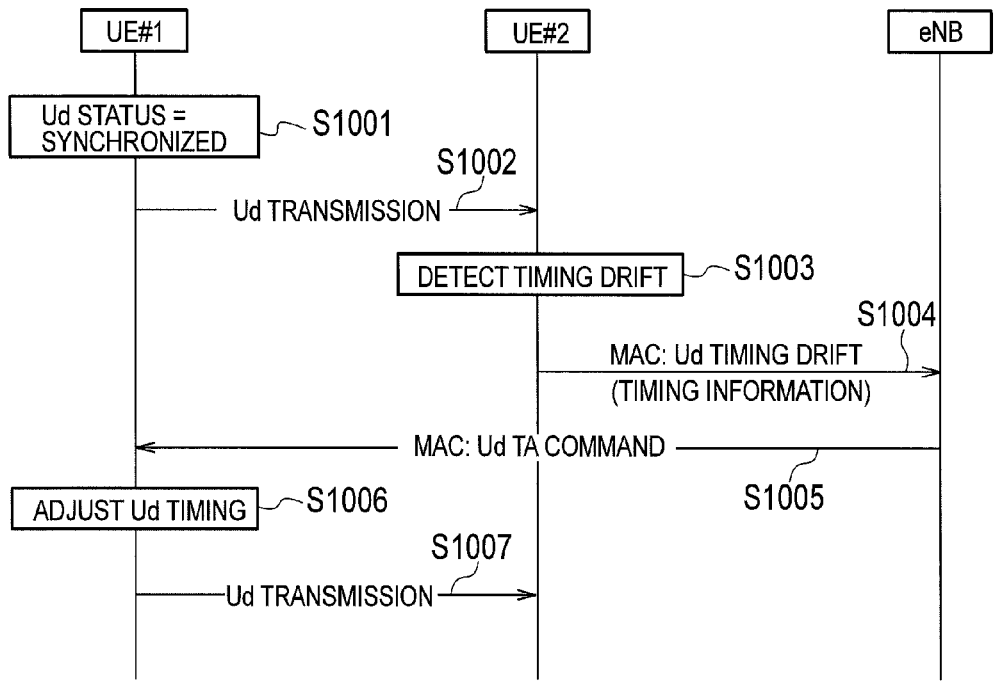
FIG. 4 is a sequence diagram illustrating operations in the mobile communication system according to the first embodiment of the present invention.

As illustrated in FIG. 4, in the state (step S1001) in which the synchronization of the third radio link has been established, the mobile station UE#1 transmits a data signal to the mobile station UE#2 via the third radio link in step S1002.

When it is detected that the reception timing of the received data signal has been deviated from the desired timing by the predetermined time or more (Timing drift) in step S1003, the mobile station UE#2 transmits "Ud timing drift" including "Timing information" indicating the time □TX, for which the reception timing of the data signal has been deviated from the desired timing, to the radio base station eNB via the second radio link in step S1004.

Furthermore, the mobile station UE#2 may transmit the "Ud timing drift" as a "MAC control element".

In step S1005, on the basis of the received "Timing information", the radio base station eNB transmits a "Ud TA command" for adjusting the transmission timing of a data signal in the third radio link to the mobile station UE#1 via the first radio link.

Furthermore, the radio base station eNB may transmit the "Ud TA command" as a "MAC control element".

The mobile station UE#1 adjusts the transmission timing (a subframe) of a data signal in the Ud interface on the basis of the "Ud TA command" in step S1006, and transmits the data signal to the mobile station UE#2 via the third radio link in the Ud interface in step S1007.

In accordance with the mobile communication system according to the first embodiment of the present invention, on the basis of deviation of the reception timing of a data signal, which is transmitted from the mobile station UE#1, from a desired timing in the mobile station UE#2, the transmission timing (UE#1→UE#2) of the data signal in the third radio link is adjusted, so that it is possible to appropriately maintain a synchronization state between the mobile station UE#1 and the mobile station UE#2.

(First Modification)

Figure 5:
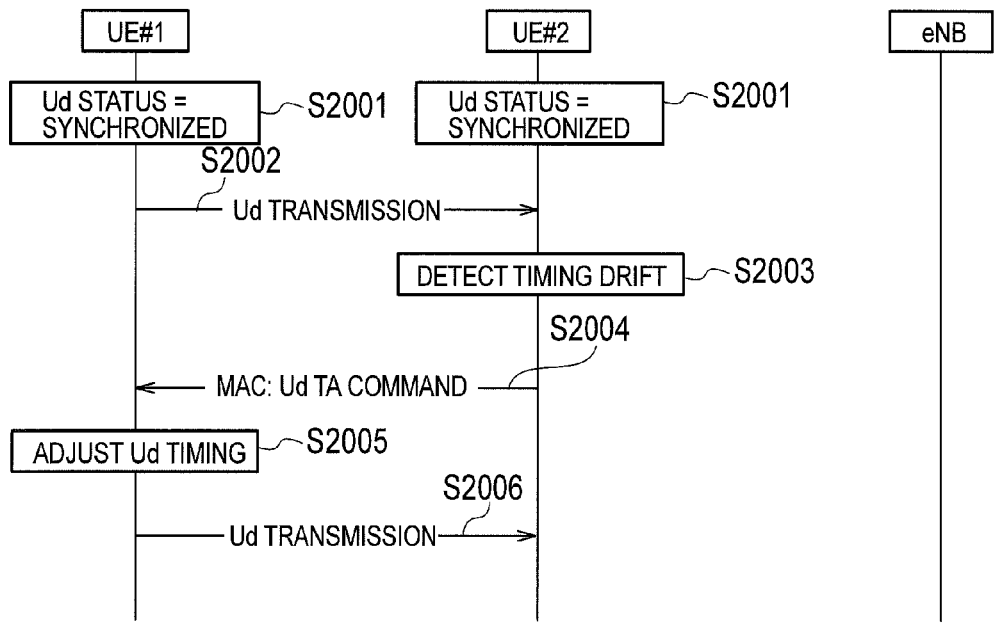
FIG. 5 is a sequence diagram illustrating the operation of the mobile communication system according to a first modification of the present invention.
Figure 6:
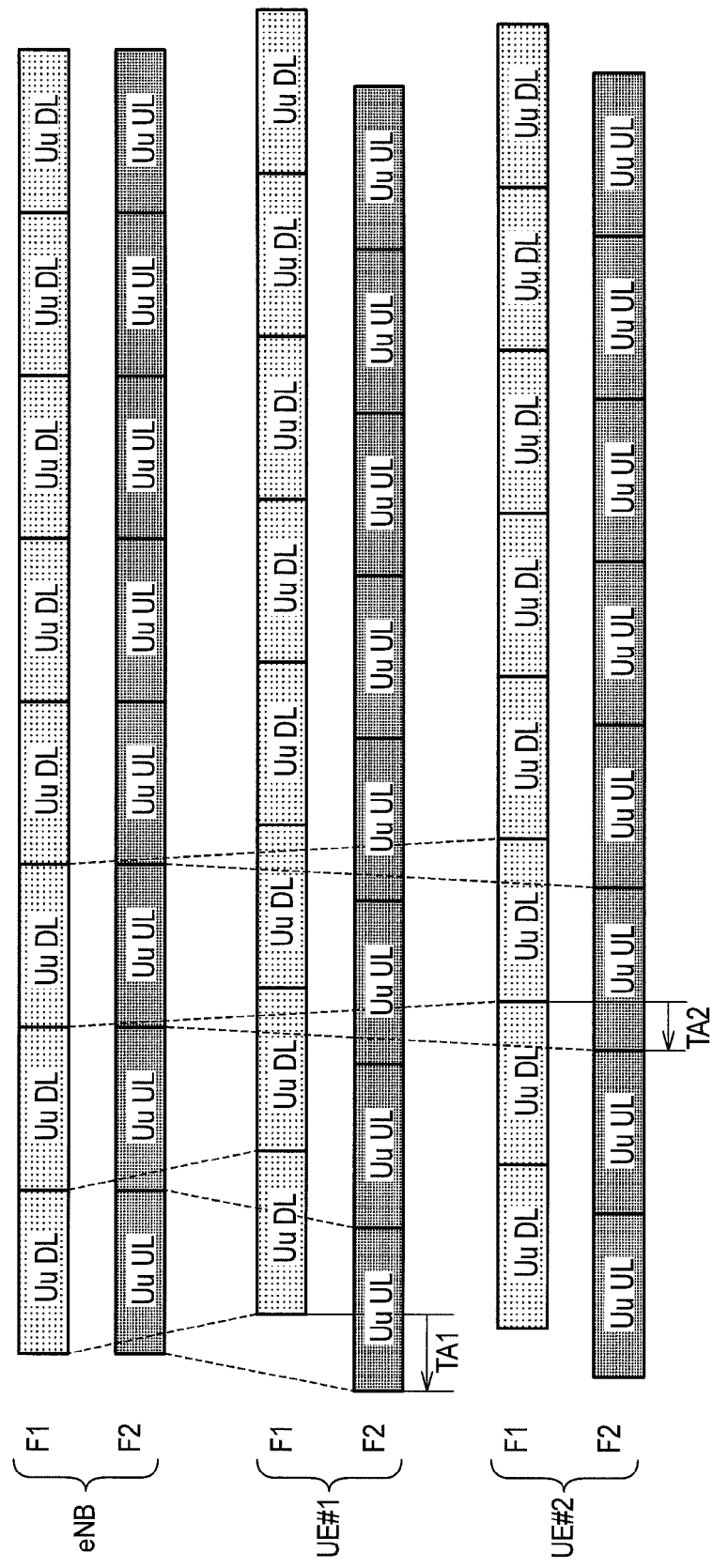
FIG. 6 is a diagram for explaining a conventional mobile communication system.
Figure 7:
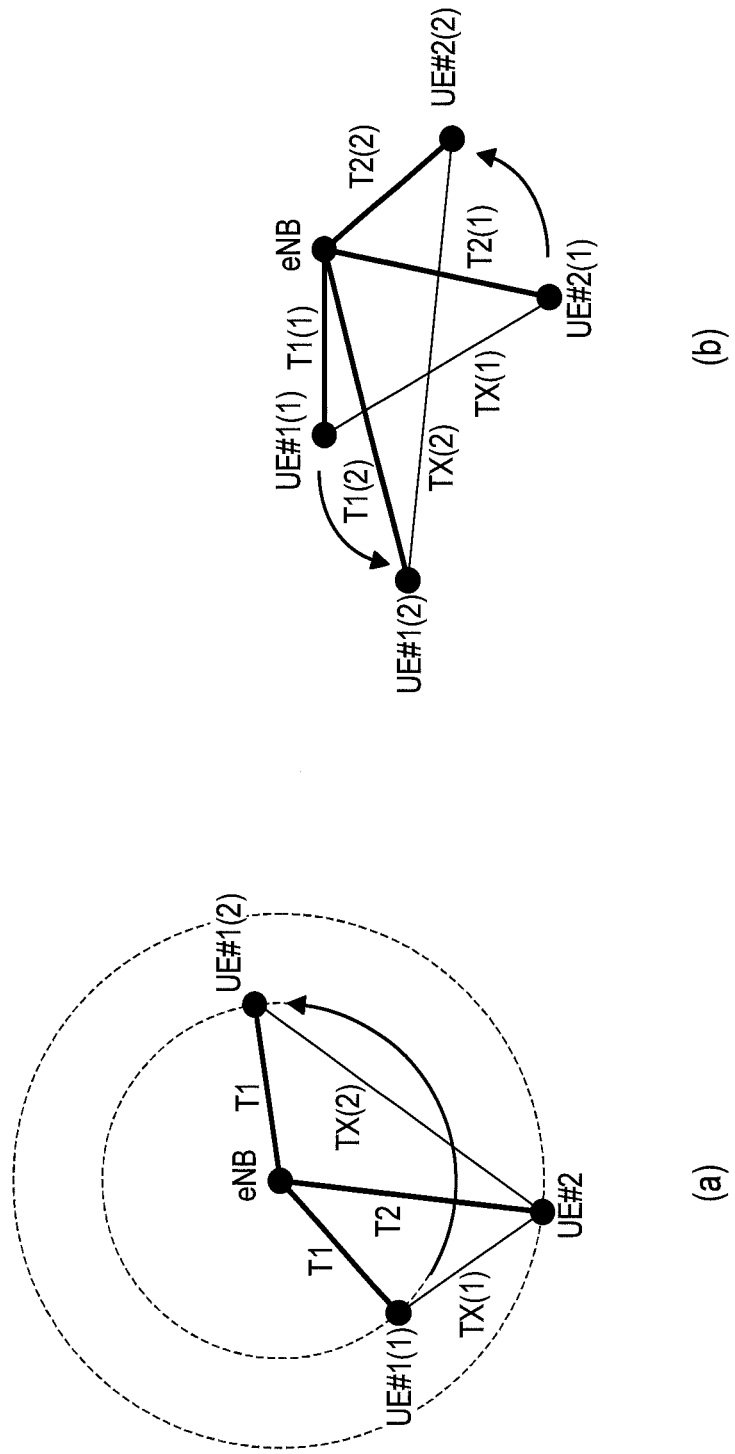
FIG. 7 is a diagram for explaining a conventional mobile communication system.

With reference to FIG. 5, a mobile communication system according to a first modification of the present invention will be described below on the basis of the points of difference from the mobile communication system according to the first embodiment above.

As illustrated in FIG. 5, in the state (step S2001) in which the synchronization of the third radio link (UE#1→UE#2) has been established, the mobile station UE#1 transmits a data signal to the mobile station UE#2 via the third radio link in step S2002.

Furthermore, it is assumed that the synchronization of the third radio link (UE#2→UE#1) has also been established in the mobile station UE#2.

When it is detected that the reception timing of the received data signal has been deviated from the desired timing by the predetermined time or more (Timing drift) in step S2003, the mobile station UE#2 transmits a "Ud TA command" for adjusting the transmission timing of a data signal in the third radio link to the mobile station UE#1 via the third radio link in step S2004.

The mobile station UE#1 adjusts the transmission timing (a subframe) of a data signal in the Ud interface on the basis of the "Ud TA command" in step S2005, and transmits the data signal to the mobile station UE#2 via the third radio link in the Ud interface in step S2006.

The characteristics of the present embodiment as described above may be expressed as follows.

A first characteristic of the present embodiment is summarized that a mobile communication method used in a case where a first radio link has been set in a Uu interface (a radio base station interface) between a mobile station UE#1 (a first mobile station) and a radio base station eNB, a second radio link has been set in the Uu interface between a mobile station UE#2 (a second mobile station) and the radio base station eNB, and a third radio link has been set in a Ud interface (an interface between mobile stations) between the mobile station UE#1 and the mobile station UE#2, includes: a step of transmitting, by the mobile station UE#1, a data signal to the mobile station UE#2 via the third radio link; a step of transmitting, by the mobile station UE#2, "Timing information (timing information)" indicating the time, for which reception timing of the data signal has been deviated from a desired timing, to the radio base station eNB via the second radio link when it is detected that the reception timing of the data signal has been deviated from the desired timing by a predetermined time or more; and a step of transmitting, by the radio base station eNB, a "Ud TA command (adjustment information)" for adjusting the transmission timing of a data signal in the third radio link to the mobile station UE via the first radio link on the basis of the received "Timing information".

A second characteristic of the present embodiment is summarized that a mobile communication method used in a case where a first radio link has been set in a Uu interface between a mobile station UE#1 and a radio base station eNB, a second radio link has been set in a Uu interface between a mobile station UE#2 and the radio base station eNB, and a third radio link has been set in a Ud interface between the mobile station UE#1 and the mobile station UE#2, includes: a step of notifying, by the radio base station eNB, the mobile station UE#1 and the mobile station UE#2 of a radio resource for data signal transmission in the third radio link via the first radio link and the second radio link; a step of transmitting, by the mobile station UE#1, a data signal to the mobile station UE#2 by using the radio resource for data signal transmission; and a step of transmitting, by the mobile station UE#2, a "Ud TA command" for adjusting the transmission timing of a data signal in the third radio link to the mobile station UE#1 via the third radio link when it is detected that the reception timing of the data signal has been deviated from a desired timing by a predetermined time or more.

In addition, the operation of the above-mentioned radio base station eNB or mobile station UE#1/UE#2 may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base station eNB and the mobile station UE#1/UE#2. Furthermore, such a storage medium and processor may be arranged in the radio base station eNB and the mobile station UE#1/UE#2 as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

In addition, the entire content of Japanese Patent Application No. 2011-112661 (filed on May 19, 2011) is incorporated in the present specification by reference.

INDUSTRIAL APPLICABILITY

As described above, according to the present invention, it is possible to provide a mobile communication method with which it is possible to appropriately maintain a synchronization state between a mobile station UE#1 and a mobile station UE#2 in direct communication between the mobile station UE#1 and the mobile station UE#2.

REFERENCE SIGNS LIST

UE . . . Mobile station
eNB . . . Radio base station
11 . . . Synchronization state management unit
12, 22 . . . Transmission unit
13, 21 . . . Reception unit
14 . . . Detection unit
15 . . . Adjustment unit

The invention claimed is:

1. A mobile communication method used in a case where a first radio link has been set in a radio base station interface between a first mobile station and a radio base station, a second radio link has been set in a radio base station interface between a second mobile station and the radio base station, a third radio link has been set in an inter-mobile station interface between the first mobile station and the second mobile station, and the first mobile station includes a timer for the first radio link and a timer for the third radio link, comprising:
 a step of transmitting, by the first mobile station, a data signal to the second mobile station via the third radio link;
 a step of transmitting, by the second mobile station, timing information indicating a time, for which the reception timing of the data signal has been deviated from a desired timing, to the radio base station via the second radio link when it is detected that the reception timing of the data signal has been deviated from the desired timing by a predetermined time or more;
 a step of transmitting, by the radio base station, adjustment information for adjusting a transmission timing of a data signal in the third radio link to the first mobile station via the first radio link on the basis of the received timing information; and
 a step of resetting the timer for the third radio link by reception of the adjustment information,
 wherein the timer for the first radio link and the timer for the third radio link are the same timer.

2. A mobile communication method used in a case where a first radio link has been set in a radio base station interface between a first mobile station and a radio base station, a second radio link has been set in a radio base station interface between a second mobile station and the radio base station, a third radio link has been set in an inter-mobile station interface between the first mobile station and the second mobile station, and the first mobile station includes a timer for the first radio link and a timer for the third radio link, comprising:
 a step of notifying, by the radio base station, the first mobile station and the second mobile station of a radio resource for data signal transmission in the third radio link via the first radio link and the second radio link;
 a step of transmitting, by the first mobile station, a data signal to the second mobile station by using the radio resource for data signal transmission; and
 a step of transmitting, by the second mobile station, adjustment information for adjusting a transmission timing of a data signal in the third radio link to the first mobile station via the third radio link when it is detected that the reception timing of the data signal has been deviated from a desired timing by a predetermined time or more; and
 a step of resetting the timer for the third radio link by reception of the adjustment information,
 wherein the timer for the first radio link and the timer for the third radio link are the same timer.

3. The mobile communication method according to claim 1, further comprising a step of determining, by the first mobile station, that the third radio link is in a non-synchronization state when the timer for the third radio link is expired.

4. The mobile communication method according to claim 2, further comprising a step of determining, by the first mobile station, that the third radio link is in a non-synchronization state when the timer for the third radio link is expired.

* * * * *